US008352335B2

(12) United States Patent (10) Patent No.: US 8,352,335 B2
Davidson (45) Date of Patent: Jan. 8, 2013

(54) SPARE PART PROCUREMENT METHOD

(76) Inventor: Kim Gilbert Davidson, Castle Cove (AU)

( * ) Notice: Subject to any disclaimer, the term of this patent is extended or adjusted under 35 U.S.C. 154(b) by 1527 days.

(21) Appl. No.: 11/569,078

(22) PCT Filed: May 10, 2005

(86) PCT No.: PCT/AU2005/000686
§ 371 (c)(1),
(2), (4) Date: Nov. 14, 2006

(87) PCT Pub. No.: WO2005/111875
PCT Pub. Date: Nov. 24, 2005

(65) Prior Publication Data
US 2008/0021796 A1 Jan. 24, 2008

(30) Foreign Application Priority Data
May 14, 2004 (AU) .............................. 2004202060

(51) Int. Cl.
*G06Q 10/00* (2012.01)
(52) U.S. Cl. ............... 705/28; 705/22; 705/29; 705/305
(58) Field of Classification Search ........................ None
See application file for complete search history.

(56) References Cited

U.S. PATENT DOCUMENTS

| 5,717,568 | A  | * | 2/1998  | Clutter et al. ............ 361/679.05 |
| 6,332,129 | B1 | * | 12/2001 | Walker et al. ................... 705/26 |
| 7,006,990 | B2 | * | 2/2006  | Stolze et al. ..................... 705/27 |
| 7,266,518 | B2 | * | 9/2007  | Klim et al. ....................... 705/28 |
| 7,376,599 | B1 | * | 5/2008  | Gerhardt .......................... 705/27 |
| 7,433,350 | B2 | * | 10/2008 | Aboujaoude et al. ......... 370/352 |
| 2001/0034673 | A1 |  | 10/2001 | Yang et al. |

(Continued)

FOREIGN PATENT DOCUMENTS

JP 2002-73832 A 3/2002

(Continued)

OTHER PUBLICATIONS

International Search Report for PCT/AU2005/000686, dated Jul. 7, 2005.

*Primary Examiner* — Ryan Zeender
*Assistant Examiner* — Fateh Obaid
(74) *Attorney, Agent, or Firm* — Abelman, Frayne & Schwab

(57) ABSTRACT

A method of facilitating broker mediated matching of a potential buyer of a spare part with a potential seller of the spare part, the potential seller having an inventory of spare parts for use in a manufacturing process run by the potential seller, the method comprising the following steps undertaken by the broker: (a) receiving a request for the spare part from a potential buyer, (b) enquiring with a potential seller as to the presence of the spare part in its inventory, (c) if the spare part is present, assessing whether or not the spare part is excess to the foreseeable needs of the potential seller in running the manufacturing process efficiently by the application of software that presents a series of questions for answering by the potential seller, the answers to which will reveal whether or not the spare part is excess to said needs, and (d) if the spare part is excess to said needs, providing means by which the potential seller and potential buyer will communicate with each other, whereby they may finalise details for securing the sale and transfer of the spare part.

9 Claims, 1 Drawing Sheet

U.S. PATENT DOCUMENTS

| | | |
|---|---|---|
| 2004/0024661 A1* | 2/2004 | Freel et al. ................ 705/28 |
| 2004/0034673 A1* | 2/2004 | Moir et al. ................ 707/204 |
| 2005/0065858 A1 | 3/2005 | Tenzer et al. |
| 2005/0192958 A1* | 9/2005 | Widjojo et al. ................ 707/5 |
| 2006/0212359 A1* | 9/2006 | Hudgeon ................ 705/26 |
| 2007/0282709 A1* | 12/2007 | Rupp ................ 705/27 |

FOREIGN PATENT DOCUMENTS

WO  WO01/67343 A2  9/2001

* cited by examiner

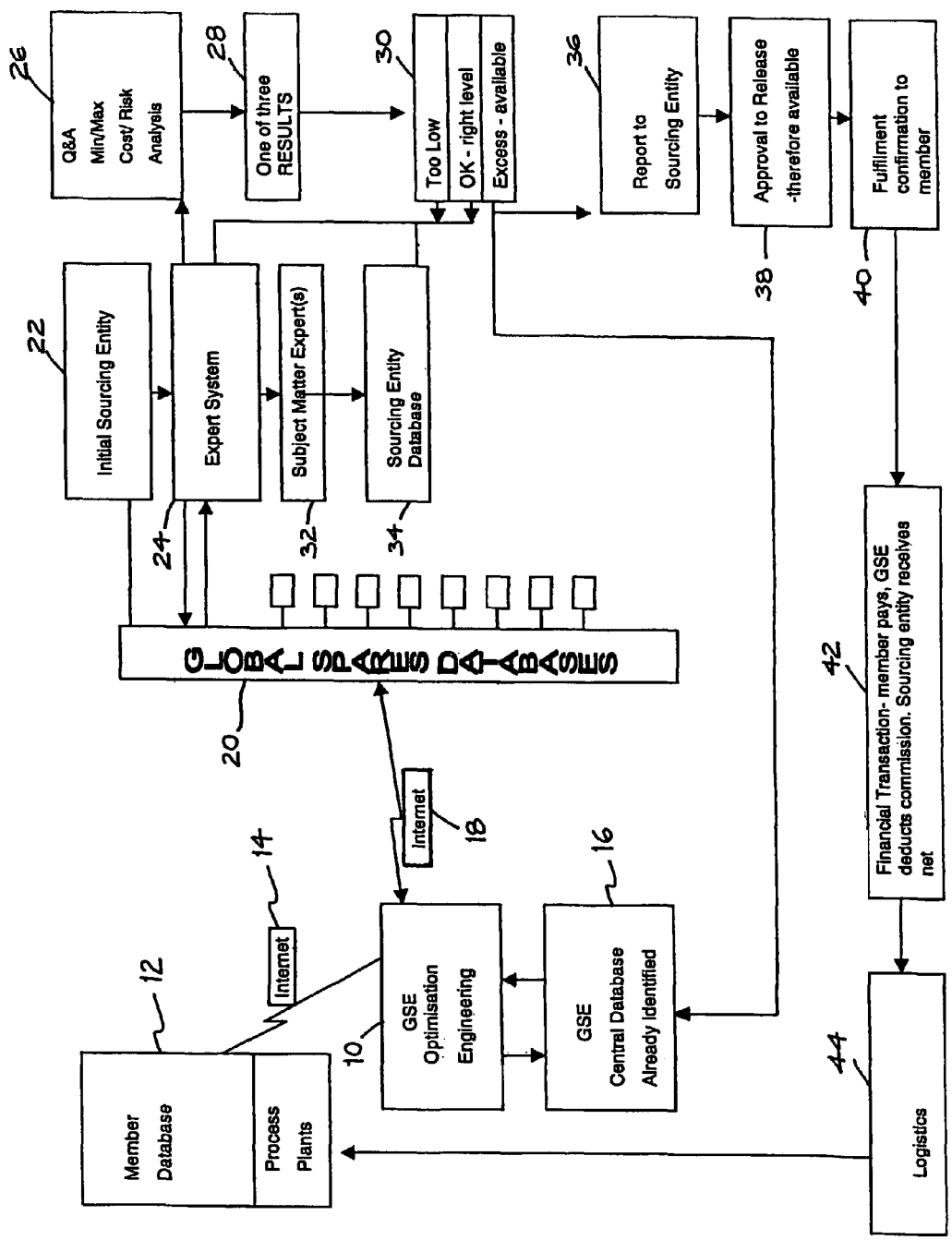

SPARE PART PROCUREMENT METHOD

FIELD OF THE INVENTION

The present invention relates to a method of facilitating broker mediated matching of a potential buyer of a spare part with a potential seller of the spare part, the potential seller having an inventory of spare parts for use in a manufacturing process run by the potential seller. The invention has particular application where the spare part sought by the potential buyer is excess to the foreseeable needs of the potential seller in running the manufacturing process efficiently.

BACKGROUND ART

The rapid and reliable sourcing of spare parts is a critical factor in the cost, risk management, or otherwise efficient running of a manufacturing process. A process manufacturing plant may urgently need a spare part as a result of sudden machinery failure or other outage, and any delays incurred in sourcing the spare part may cause a delayed restart or downtime in production, costing the plant a considerable amount in lost manufacturing productivity and profits.

Presently, a process manufacturing plant may seek to contact an original vendor (or traditional broker or even another manufacturing plant) of the spare part to buy a replacement, but such a request may be met with a longer than acceptable delivery time (with or without rush fees), or news that the original vendor has ceased production of the part or has gone out of business, or that the price of the part has increased beyond that which the plant is prepared to pay.

Another current approach involves vendors and users advertising any spare parts for sale if and when they become available on an on-line "notice board". The determination that a spare part is available for sale (or even exchange) is made as a result of conventional, "unsophisticated", industry practices.

The most commonly used and simple approach that seeks to identify the number of spare parts held by a manufacturing plant utilizes movement history analysis to track or record the movement over time of a part used in its manufacturing process. However, that approach usually relies on limited historical information rather than on current information on the location and quantity of the spare part, and so may not provide for the rapid and reliable sourcing of the spare part.

An, as yet, virtually untapped source of spare parts is the approximately 150,000 process manufacturing plants worldwide that have an existing combined inventory of after market spare parts valued at over US$1 Trillion for use in their manufacturing processes. Analysis has shown that these plants carry about 23% more spare parts than are actually needed to run the manufacturing processes of the plants efficiently, amounting to at least about US$230 Billion worth of spare parts that are excess to the collective foreseeable needs of these plants in running their manufacturing processes efficiently, and that may be available to other plants in need of any such parts.

Obtaining rapid and reliable access to this after market source in excess spare parts would greatly reduce downtime of machinery and hence improve productivity and profits for both the buyer and the seller.

SUMMARY OF THE INVENTION

The present inventor has developed a method by which a broker may facilitate the matching of a potential buyer of a spare part with a potential seller of the spare part, the potential seller having an inventory of spare parts for use in a manufacturing process, such as in a manufacturing plant, run by the potential seller, some of which spare parts the potential seller does not know are excess to the foreseeable needs of the potential seller and which the potential buyer is desirous to buy.

According to the invention, there is provided a method of facilitating broker mediated matching of a potential buyer of a spare part with a potential seller of the spare part, the potential seller having an inventory of spare parts for use in a manufacturing process run by the potential seller, the method comprising the following steps undertaken by the broker:
 (a) receiving a request for the spare part from a potential buyer,
 (b) enquiring with a potential seller as to the presence of the spare part in its inventory,
 (c) if the spare part is present, assessing whether or not the spare part is excess to the foreseeable needs of the potential seller in running the manufacturing process efficiently by the application of software that presents a series of questions for answering by the potential seller, the answers to which will reveal whether or not the spare part is excess to said needs, and
 (d) if the spare part is excess to said needs, providing means by which the potential seller and potential buyer will communicate with each other, whereby they may finalise details for securing the sale and transfer of the spare part.

BRIEF DESCRIPTION OF THE DRAWINGS

FIG. 1 is a diagrammatic illustration of a preferred method of the present invention.

BEST MODES FOR CARRYING OUT THE INVENTION

The method shown diagrammatically in FIG. 1 comprises the following steps. A broker 10 (such as an experienced engineer in a particular field of manufacturing, or a team of experts in various fields) sets up and administers a membership database 12 consisting of potential buyers of spare parts. Applications for membership as a potential buyer may be received on the broker's website and a fee is payable for an agreed duration of membership. Such members will primarily be manufacturing plants.

A member submits a request for a spare part (say, by name of part and part number) via the internet 14 that is received at the broker's website, such as by completing an on-line or virtual request form appearing on the website. The broker acknowledges receipt of the request and, for the purpose of continuously updating the member on actions the broker has taken in response to the request, provides a "rolling activity report" in a dedicated portion of the website.

The broker, optionally, may conduct an initial search of database records 16 held by the broker that record previously identified spare parts that, at the time of recordal, were available from a variety of manufacturing plants and were deemed excess to the foreseeable needs of those plants.

If that initial search (and possible follow up of a plant recorded as having the spare part of interest) does not reveal that the spare part is available, the broker enquires, say, via the internet 18, of any required number of the approximately 150,000 manufacturing plants 20 worldwide (that have an inventory of spare parts for use in their manufacturing processes) as to the presence of the spare part of interest until that spare part is confirmed as being present from at least one plant (hereinafter referred to as a "sourcing entity"). If a sourcing entity holding the spare part is willing to sell it, then the broker provides means by which the sourcing entity and member will communicate with each other, whereby they may finalise details for securing the sale and transfer of the spare part.

If, however, a sourcing entity 22 holding the spare part is reluctant to sell it, as would most likely be the case, the broker will conduct a sophisticated assessment as to whether or not that part is excess to the foreseeable needs (which may be primarily cost and risk based needs) of the sourcing entity 22 in running its manufacturing process efficiently. The assessment involves the application of software 24 that presents, interactively over the internet, a series of questions, derived from experts, for answering by the sourcing entity 22. The answers to those questions reveal, by computer processing 26 of the answers according to a predetermined score or marking scale, also derived from experts, a result 28 that indicates whether or not the spare part is excess to the sourcing entity's aforementioned needs, whereby the reluctance of a sourcing entity to sell the part may be overcome if the outcome 30 of the assessment is that the part is excess to such needs. Some of the questions are intended to determine how critical is a spare part to the cost, risk management, or otherwise efficient running of the manufacturing process. The answers to those questions will also reveal as a possible outcome 30 whether or not the spare part is held by the sourcing entity in numbers that are at too low a level or at a correct level.

A sample of some expert derived questions that may be asked (and their possible answers) in the assessment are as follows:

| Response | Check Best Answer |
|---|---|
| | IS THE ITEM LIKELY TO FAIL IN-SERVICE? |
| 1. | Failures are common with this type of item. |
| 2. | Item is subject to noticeable wear and tear. |
| 3. | Item is durable and not subject to undue stress. |
| | WHAT IS THE EFFECT ON PRODUCTION CAPACITY DUE TO ITEM FAILURE? |
| 1. | Direct and measurable loss of production. |
| 2. | Possible loss of production or reduction in production efficiency. |
| 3. | No expected loss of production within required repair time. |

Each possible answer for any one question has a predetermined score, the score for giving any one answer to a question being different to the score for giving any other answer to the question, whereby a cumulative score is achieved by answering the series of questions that will reveal whether or not the spare part is excess to said needs.

The assessment requires that the sourcing entity allow its inventory database 34 of spare parts to be queried by the broker for a spare part of interest before application of the assessment software 24. The series of questions then presented by the software 24 are answered by subject matter experts 32 employed by the sourcing entity 22 who communicate with the broker 10 via the internet.

If the outcome 30 of the assessment reveals that the numbers level of the spare part is too low, then the sourcing entity 22 will be unable to sell the part and will also realise that, based on the outcome of the assessment, it will need to buy more of that spare part to achieve the correct level, whereby the sourcing entity 22 may be encouraged to apply for membership as a potential buyer and, if membership is granted, the method for spare part procurement as aforementioned may be carried out on behalf of that new member (previously a sourcing entity) as the potential buyer.

If the aforementioned manufacturing plant is unable to sell the part, as a result of the aforementioned assessment, the broker continues its enquiry (or search) of other manufacturing plants 20 worldwide, one by one, until the spare part of interest is eventually confirmed as being present from yet another "sourcing entity" 22. The method steps as aforementioned are then repeated before an outcome 30 is achieved. During all this time, the steps or actions taken by the broker are logged and recorded on the "rolling activity report" on its website for real time review by the member.

When the spare part is revealed and reported 36 to the sourcing entity 22 as being at an excess level, the sourcing entity is free to agree 38 to sell the part to the member. If so, the member is contacted 40 by the broker, who confirms the sale agreement and initiates the financial transactions 42 by firstly deducting an earlier agreed broker commission fee before providing means (such as by telephone, e-mail or other electronic means) by which the sourcing entity and the member will communicate with each other. Details for securing the sale and the logistics 44 for transferring of the spare part are transacted directly between the sourcing entity and member, which allows for full disclosure therebetween.

If after sale to the member of the spare part of interest, there remains an excess level of that spare part held by the sourcing entity, then that excess level may be recorded in the database records 16 held by the broker for future sale.

Various modifications may be made in details of method steps, software and hardware, including communication devices, used in the method without departing from the scope and ambit of the invention.

The invention claimed is:

1. A method for facilitating the sale of a specified spare part between a first manufacturer which possesses, but is reluctant to sell, such spare part, and a second manufacturer who is seeking to buy such spare part (hereinafter "prospective buyer"), comprising the steps of:
   (i) providing a website programmed to receive from said prospective buyer, via the internet, a request for a specified spare part;
   (ii) maintaining a global database of manufacturers who may have various types of spare parts available;
   (iii) in response to such request, selecting from a database at least one manufacturer, other than the prospective buyer, who may possess the specified spare part;
   (iv) sending over the internet to each selected manufacturer an inquiry whether such manufacturer possesses the specified spare part;
   (v) upon receiving a response from a particular manufacturer (hereinafter "potential source") that said potential source has, but is reluctant to sell, the specified spare part, presenting interactively over the internet a series of questions to be answered by said potential source; wherein said questions are derived from experts in order to be able to determine whether the potential source's current supply of said part is excessive, correct, or insufficient; wherein said questions include at least one question to determine the frequency and likelihood of failure of the particular part during production operations, and at least one question to determine the consequences to the production operation should such part fail;
   (vi) upon receiving responses to said questions from said potential source, processing such responses using a computer programmed to assign a predetermined score to each response, to ascertain an overall cumulative score; and determine, based at least on cumulative score, the risk whether the current level of inventory of said specified spare part held by said potential source is excessive, correct, or insufficient;
(vii) communicating over the internet the results of such determination to said potential source;
(viii) in the event the potential source's inventory is excessive, requesting electronically said potential source to authorize a sale of said specified spare part; and
(ix) in the event said potential source authorizes said sale, brokering a sale between said potential source and said prospective buyer.

2. A method as defined in claim 1, wherein said expert-derived question to determine the consequences should such part fail asks the potential source to select from the following answers: (a) direct and measurable loss of production; (b) possible loss of production or reduction in production efficiency; and (c) no expected loss of production.

3. A method as defined in claim 1, wherein said expert-derived question to determine the frequency and likelihood of failure asks the potential source to select from the following answers: (a) failures are common; (b) the item is subject to noticeable wear and tear; and (c) the item is durable and not subject to undue stress.

4. A method according to claim 1, further comprising the steps of maintaining electronically a database of members, and accepting requests for spare parts only from prospective buyers who are members.

5. A method according to claim 1, further comprising the steps, in response to receiving a request for a spare part from a prospective buyer, of maintaining and updating on said website a rolling progress report.

6. A method according to claim 1, further comprising the steps of maintaining electronically a spare part database of known available spare parts and, upon determining that a potential source has excess inventory of a spare part, updating said spare part database.

7. A method according to claim 1, wherein in step (iii) a plurality of manufacturers are selected.

8. A method for attempting to facilitate the sale of a specified spare part between a first manufacturer which possesses, but is reluctant to sell, such spare part), and a second manufacturer who is seeking to buy such spare part (hereinafter "prospective buyer"), comprising the steps of:
(i) providing a website programmed to receive from said prospective buyer, via the internet, a request for a specified spare part;
(ii) maintaining a global database of manufacturers who may have spare parts available;
(iii) in response to such request, selecting from a database at least one manufacturer, other than the prospective buyer, who may possess the specified spare part;
(iv) sending over the internet an inquiry to each selected manufacturer an inquiry whether such manufacturer possesses the specified spare part;
(v) upon receiving a response from a particular manufacturer (hereinafter "initial potential source") that said initial potential source has, but is reluctant to sell, the specified spare part, presenting interactively over the internet a series of questions to be answered by said initial potential source; wherein said questions are derived from experts in order to be able to determine whether said initial potential source's current supply of said part is excessive, correct, or insufficient; wherein said questions include at least one question to determine the frequency and likelihood of failure of the particular part during production operations, and at least one question to determine the consequences to the production operation should such part fail;
(vi) upon receiving responses to said questions from said initial potential source, processing such responses using a computer programmed to assign a predetermined score to each answer, to ascertain an overall cumulative score; and determine, based at least on cumulative score, the risk whether the current level of inventory of said specified spare part held by said initial potential source is excessive, correct, or too low;
(vii) communicating over the internet the results of such determination to said initial potential source;
(viii) in the event that said initial potential source's inventory is correct or too low, repeating steps (v) through (vii) with respect to other potential sources until another potential source is identified having excess inventory of said specified spare part ("new potential source"); then
(ix) requesting electronically said new potential source to authorize a sale of said specified spare part; and
(x) in the event said new potential source authorizes said sale, brokering a sale between said new potential source and said prospective buyer.

9. The method of claim 8, further comprising the step, if the initial potential source's inventory is too low, inquiring electronically whether the initial potential source will authorize a search for the specified spare part to be purchased by the initial potential source and, in response to authorization, repeating steps (v) through (x) on behalf of said initial potential source.

* * * * *